Jan. 23, 1962  E. H. SHARP  3,017,756
UNIVERSAL JOINT
Filed July 6, 1959  2 Sheets-Sheet 1
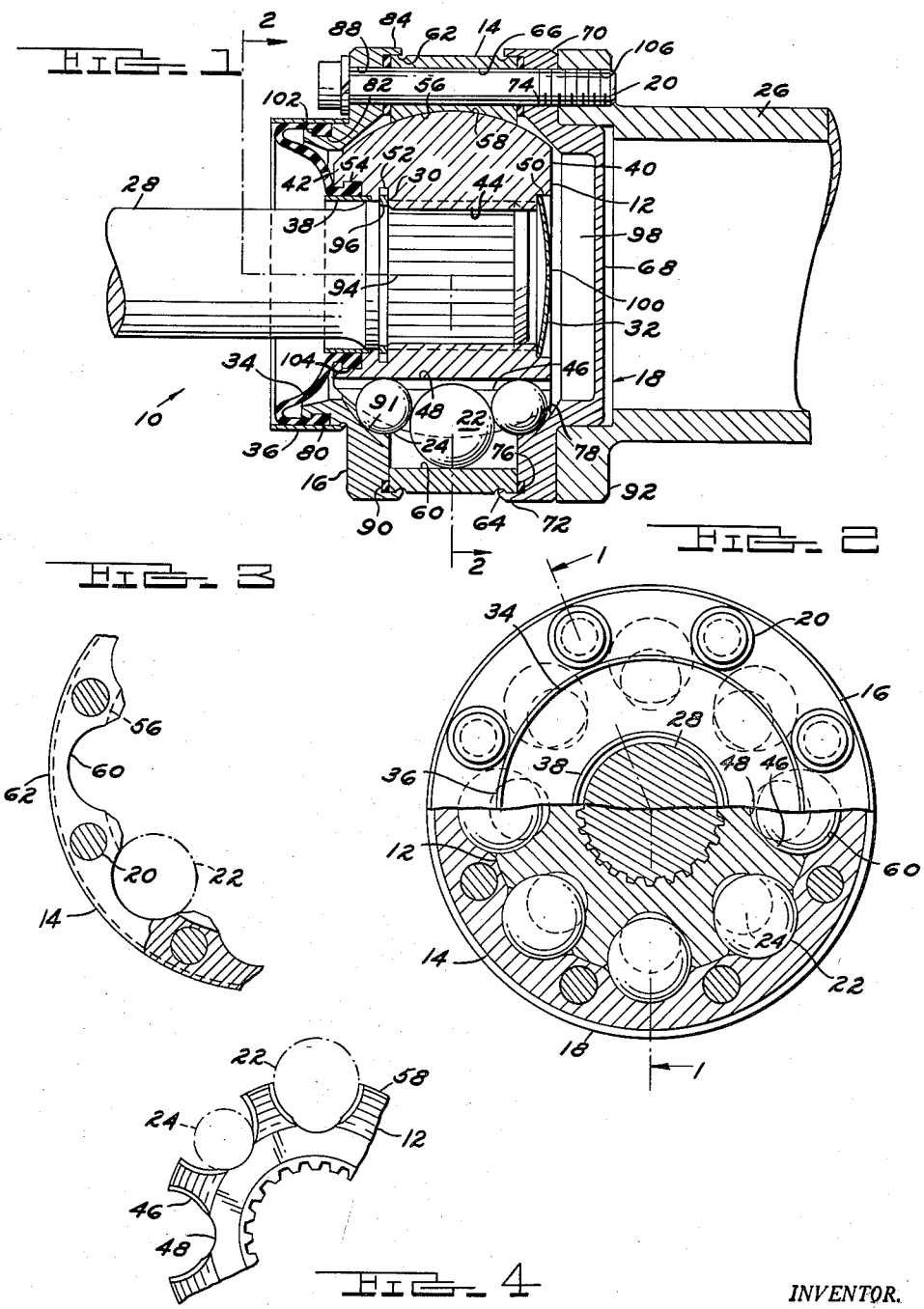
INVENTOR.
EVERETT H. SHARP
BY Whittemore
Hulbert & Belknap
ATTORNEYS Jan. 23, 1962 E. H. SHARP 3,017,756
UNIVERSAL JOINT
Filed July 6, 1959 2 Sheets-Sheet 2
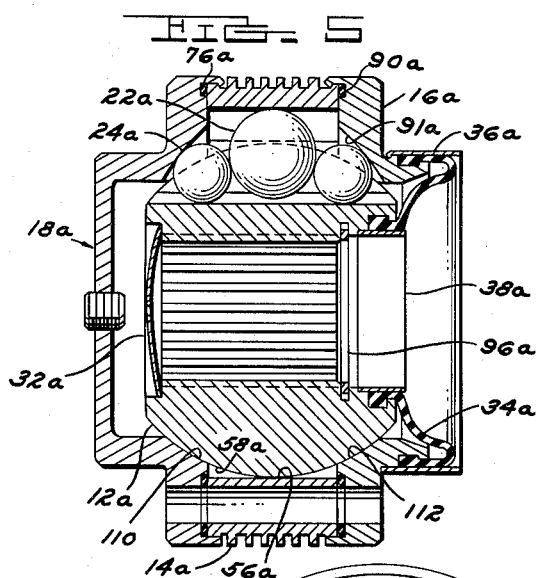
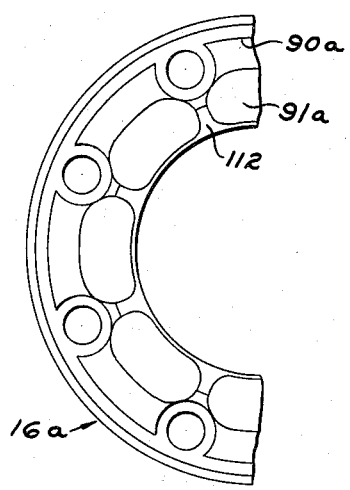
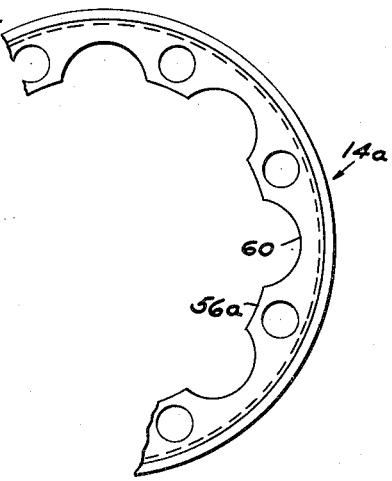
INVENTOR.
EVERETT H. SHARP
BY Whittemore
Hulbert & Belknap
ATTORNEYS

United States Patent Office 3,017,756
Patented Jan. 23, 1962

1

3,017,756
UNIVERSAL JOINT
Everett H. Sharp, Berkley, Mich., assignor to Dana Corporation, Toledo, Ohio, a corporation of Virginia
Filed July 6, 1959, Ser. No. 825,149
32 Claims. (Cl. 64—21)

The present invention relates to universal joints and refers more particularly to a constant velocity ball type universal joint including pilot balls for positioning the driver balls thereof and constructed to minimize the effect on the universal joint of the centrifugal forces developed in the joint due to rotation of the driver and pilot balls during operation of the universal joint and to reduce the frictional resistance to operation of the universal joint.

In the past it has been the practice in the manufacture of universal joints to provide grooves in the ball races thereof for the torque transferring or driver balls thereof which were axially arcuate with respect to the driven and driver shafts of the universal joint and to provide driver ball cages which cooperate with the arcuate grooves through the driver balls to align opposite driver balls through the pivot point or center of rotation of the universal joint during operation of the joint.

The arcuate grooves and driver ball cages as constructed in the past have transferred much of the centrifugal force developed by the rapid rotation of driver balls within the universal joint into axial stresses within the members of the joint. Also, the driver ball cages of past universal joints have added to the frictional resistance to rotation developed by the members of the joints. Both unbalanced axial forces between members of a universal joint and frictional resistance to rotation of the joint are undesirable in that they reduce the operating efficiency of universal joints and shorten the useful life thereof.

Therefore it is one of the objects of the present invention to provide a constant velocity ball type universal joint including means to reduce the frictional resistance to rotation developed thereby during operation thereof.

Another object is to provide a constant velocity ball type universal joint including pilot balls for positioning the driver balls during operation of the universal joint.

Another object is to provide a ball type universal joint wherein the centrifugal forces developed due to the rapid rotation of the ball therein are substantially cancelled within the joint in a manner not impairing the operating efficiency of the universal joint.

Another object is to provide a ball type universal joint having driver ball receiving grooves in the inner and outer ball races which are axially parallel to the respective driven and driver shafts of the universal joint.

More specifically it is an object to provide a ball type universal joint having driver ball receiving grooves in inner and outer ball races which are curved only in cross-section and wherein the driver ball is positioned in said grooves during operation of the universal joint by pilot balls.

Still more specifically it is an object to provide a ball type universal joint including an inner and outer ball race, the inner ball race having axially extending pilot ball grooves in axially extending driver ball grooves radially spaced around the exterior thereof, the outer ball race having registering driver ball grooves on the interior thereof, a cover at each end of the ball races having arcuate cam surfaces therein opposite the pilot ball grooves in said inner ball race, driver balls within the driver ball grooves for transferring torque between the ball races, and pilot balls on each side of the driver balls in the pilot ball grooves and in contact with the cam surfaces for positioning the driver balls axially in the driver ball grooves during operation of the universal joint.

2

These and other objects, advantages and novel details of construction of this invention will be made more apparent as this description proceeds, especially when considered in connection with the accompanying drawings, wherein:

FIGURE 1 is a longitudinal section view of a constant velocity ball type universal joint constructed according to the invention taken on the line 1—1 in FIGURE 2.

FIGURE 2 is a view of the universal joint of FIGURE 1 along the line 2—2 in FIGURE 1 showing the joint partly in end elevation and partly in cross-section.

FIGURE 3 is a partial elevation partly broken away of the outer ball race of the universal joint of FIGURE 1.

FIGURE 4 is a partial elevation of the inner ball race of the universal joint of FIGURE 1.

FIGURE 5 is a longitudinal section of a modification of the constant velocity ball type universal joint shown in FIGURES 1–4.

FIGURE 6 is a partial elevation of one of the covers of the universal joint of FIGURE 5.

FIGURE 7 is a partial elevation of the outer ball race of the universal joint shown in FIGURE 5.

One embodiment of the constant velocity ball type universal joint of the invention will now be described with particular reference to the figures of the drawing. As shown in FIGURE 1 the universal joint generally indicated 10 includes an inner ball race 12, an outer ball race 14 encircling the inner ball race 12 and in contact therewith, a pair of cover members 16 and 18 secured to opposite surfaces of the outer ball race 14 by means of bolts 20, and driver balls 22 and pilot balls 24 positioned between the inner and outer ball races 12 and 14 and the covers 16 and 18 as shown. Hollow shaft 26 clamped to cover 18 by means of bolts 20 and shaft 28 inserted in the inner ball race 12 are provided in conjunction with the universal joint 10 as input and output means.

A snap ring 30 is provided between the inner ball race 12 and the shaft 28 to lock the shaft 28 to the inner ball race 12. Plug 32 is inserted in the inner ball race 12 as shown to prevent the escape of lubricating fluid from the universal joint during operation thereof. Annular seal 34 extends between the inner ball race 12 and the cover 16 to prevent escape of lubrication from the universal joint 10 and to prevent dirt and grit from entering the joint. The seal 34 is held in place on cover 16 by an outer sleeve 36 and is secured in place on the inner ball race 12 by an inner sleeve 38.

The inner and outer ball races 12 and 14 in conjunction with the covers 16 and 18 and driver balls 22 and pilot balls 24 are arranged as shown in FIGURE 1 to form a universal joint 10 in which no ball cage is required to position the driver balls, which eliminates a substantial portion of the friction created on contacting surfaces of former universal joints. Also, the centrifugal forces generated in the universal joint 10 due to rapid rotation of the pilot and driver balls 24 and 22 during operation of the universal joint produce substantially no unbalanced axial thrust between inner and outer ball races 12 and 14.

More specifically the inner ball race 12 as shown best in FIGURES 1 and 4 is a generally spherical member between parallel planar surfaces 40 and 42 having an axial passage 44 therethrough perpendicular to the surfaces 40 and 42. It will be understood that the passage 44 is provided to receive the shaft 28 and that the shaft 28 may be attached to the inner race 12 by other means if desired. Meridional driver ball grooves 46 are provided spaced angularly around the outer spherical surface of the inner ball race 12. The grooves 46 are parallel to the passage 44 and are perpendicular to the surfaces 42 and 40 as shown. Within each driver ball grooves 46 and axially therewith and parallel thereto separate pilot ball grooves 48 are also provided in inner ball race 12.

It will be noted that both the driver ball grooves 46 and the pilot ball grooves 48 are straight between the surfaces 42 and 40 of the inner ball race 12. This construction permits the manufacture of both the driver ball grooves and the pilot ball grooves in a single operation. The ball joint 10 produced with straight pilot ball and driver ball grooves as shown will therefore be less expensive than ball joints having arcuate pilot and driver ball grooves.

The surface of the passage 44 extending between surfaces 40 and 42 of the inner ball race 12 is splined as shown in FIGURE 4 to receive shaft 28. The passage 44 is countersunk at the end thereof adjacent surface 40 to produce recess 50. A plug 32 is held by frictional forces within the recess 50 as shown in FIGURE 1. Passage 44 also includes an annular groove 52 on the interior thereof into which a snap ring 30 may be placed to retain shaft 28 within the inner ball race 12. A second annular groove 54 is provided in passage 44 near the surface 42 of the inner ball race 12 and the passage is countersunk at the end thereof adjacent surface 42 to provide the configuration shown best in FIGURE 1 for the attachment of seal 34 and inner sleeve 38 to the inner ball race 12.

The outer ball race 14 as shown in FIGURES 1 and 3 is generally in the shape of an annular ring. The inner surface 56 of the outer ball race 14 is arcuate in cross section to give a bearing contact with the outer spherical surface 58 of the inner ball race 12. Axial driver ball grooves 60 are provided spaced angularly around the inner surface 56 of the outer ball race 14 in registration with the driver ball grooves 46 in the outer surface 58 of the inner ball race 12. Annular grooves 62 are provided in the outer surface of the outer ball race 14 as best shown in FIGURE 1. Grooves 62 are provided in conjunction with lips 72 on covers 16 and 18 so that the covers may be staked to the outer ball race as shown at 64 in FIGURE 1 to hold the covers on the joint 10 during handling, shipping and the like until the joint is mounted by means of bolts 20. It will be understood that any convenient means other than lips 72 and grooves 62 may be provided to hold the joint in assembly during handling thereof. Passages 66 extend through the outer ball race 14 around the periphery thereof alternate with and parallel to grooves 60. The passages 66 are provided to allow the bolts 20 to pass through the outer ball race 14 clamping the outer ball race 14 and the covers 16 and 18 and shaft 26 in assembled relation.

Cover 18 as shown includes a dish shaped portion 68, an annular flange 70 and a lip 72 attached to the flange 70. The dish shaped portion of the cover 18 serves as a reservoir for lubricating fluid for the universal joint 10. The annular flange section 70 is provided with peripheral passages 74 therethrough in registration with the peripheral passages 66 through the outer ball race 14 to allow passage of bolt 20 therethrough and clamping of the cover 18 to the outer ball race 14. A seal 76 is provided between the cover 18 and the outer ball race 14 as shown in FIGURE 1.

Cam surfaces 78 are provided on the inside of cover 18 at the intersection of the dish shaped portion 68 and the flange 70. The cam surfaces 78 are spaced angularly around the cover 18 in registration with the pilot ball grooves in the inner ball race 12. The arcuate cam surfaces 78 have a compound curved surface as shown in FIGURE 1 and are provided to guide the movement of the pilot balls 24 during angular movement of shaft 26 or shaft 28 in operation of the universal joint 10.

Cover 16 is generally annular in shape as shown in FIGURE 1 and includes a flange 80 extending outwardly from the universal joint and having a recess 82 therein to receive the seal 34. A lip 84 similar to the lip 72 on cover 18 is provided on cover 16 in conjunction with a second groove 62 on outer ball race 14 for the purpose of staking the cover 16 to the outer ball race 14. Passages 88 similar to passages 74 in cover 18 are provided around the periphery of cover 16 in registration with the passages 66 in the outer ball race 14 to permit the passage of clamping bolts 20 therethrough. Seal 90 is provided between the cover 16 and the outer ball race 14 as shown. Both seals 90 and 76 are provided to prevent leakage of lubricating fluid from the universal joint 10.

Cam surfaces 91 are provided on the interior of cover 16 in registration with the pilot ball grooves 48 in the inner ball race 12. The cam surfaces 91 are similar in all respects to the cam surfaces 78 previously described. The cam surfaces are arcuate and have a compound curvature as shown best in FIGURE 1 as previously indicated and serve as a guide for the movement of pilot balls 24 during the movement of pilot balls 24 during the movement of the universal joint 10.

As shown in FIGURE 1 in the assembled universal joint 10 driver balls 22 are placed between the inner and outer ball races 12 and 14 in the driver ball grooves 46 and 60. The purpose of the driver balls 22 is, as in the usual universal joint, to transfer torque between the inner and outer ball races 12 and 14. According to the invention a pilot ball 24 is positioned at each side of each driver ball 22 in pilot ball grooves 48 and in contact with one of the respective cam surfaces 78 or 91 and with driver balls 22. In the operation of the universal joint 10 the driver balls 22 are positioned in driver ball grooves 46 and 60 by pilot balls 24 on angular movement of the universal joint. The pilot balls 24 are guided in pilot ball grooves 48 by cam surfaces 78 and 91 so that the driver balls 22 always rotate in a common plane which passes through the intersection of the axes of the shafts 28 and 26 and bisects the angle formed by the shafts in operation of the universal joint 10.

It will readily be appreciated that movement of the driver balls 22 by pilot balls 24 rather than by a ball cage as has been the case in the past provides a universal joint having less frictional resistance to rotation than past universal joints and it will therefore be subject to less heat and wear than has been the case with other types of universal joints. Furthermore the construction as shown in FIGURE 1 provides complete balancing within the universal joint of the centrifugal forces acting on the universal joint due to the rapid rotation of the driver balls 22 and pilot balls 24.

The centrifugal forces developed by the rotation of pilot balls 24 will be of equal magnitude since the balls are of equal size and since the balls act on surfaces on covers 16 and 18 and on driver balls 22 which are axially opposed as shown in FIGURE 1 the axial component of the centrifugal force will be cancelled through covers 16 and 18 and the outer ball race 14 and through driver balls 22. Furthermore the axial forces created by the rapid rotation of the driver balls 22 will be equal and in opposite directions on opposite sides of the universal joint in any angular position thereof since the driver ball grooves 60 and 48 will diverge in opposite directions on opposite sides of the universal joint 10 due to the linear longitudinal section thereof. The total centrifugal force developed by the driver balls 22 acting on the universal joint 10 will therefore also have a zero axial component.

Hollow shaft 26 as shown is provided with a flange 92 which is clamped to the flange 70 of cover 18 by means of bolts 20 as shown in FIGURE 1. Shaft 26 may be either the driven or the driving shaft of the universal joint 10 and may of course be solid or hollow as desired. Shaft 28 as shown in FIGURE 1 extends in the opposite direction from the shaft 26 and as shown is splined on the end 94 which is inserted in the splined passage 44 in the inner ball race 12. The shaft 28 is locked within the passage 44 by means of an annular groove 96 around shaft 28 in registration with the annular groove 52 in passage 44 of the inner ball race 12 in conjunction with a snap ring 30 acting between the grooves 52.

Plug 32 which is placed within the countersunk recess 50 on the side 40 of the inner ball race 12 is a substantially flat circular disk and is provided to prevent the escape of lubricating fluid from the chamber 98 formed by the dish shaped portion 68 of the cover 18 during operation of the universal joint 10. A small opening 100 is provided in the plug 32 to act as a vent for air which may be trapped within the universal joint 10 during operation thereof. It is necessary to provide the opening 100 in plug 32 to prevent air trapped within the universal joint 10 from causing seal 34 to bulge outwardly of the universal joint during operation thereof thereby causing excessive wear of the seal 34 and shortening its useful life.

Seal 34 having the cross section as shown in FIGURE 1 is attached to the inner ball race 12 and to the cover 16 by means of annular flanges 102 and 104 which are formed to fit within recesses 82 and 54 respectively in the covers 60 and inner ball race 12. The flange 104 is held within the recess 54 by means of the inner sleeve 38 which is pressed into place on inner ball race 12 as shown. Flange 102 is held within recess 82 by means of outer sleeve 36 which has a pressed fit over flange 80 of cover 16. Seal 34 prevents the escape of lubricating fluid from the universal joint 10 while allowing angular movement between shafts 26 and 28.

In operation as the shaft 28 is angularly positioned with respect to the shaft 26 the driver balls 22 will be axially positioned within the driver ball grooves 46 and 60 by the pilot balls 24 at each side of each driver ball 22. The pilot balls 24 are guided in their movement in pilot ball grooves 48 during angular positioning of the shaft 28 with respect to the shaft 26 by the double curved cam surfaces 78 and 91 on covers 16 and 18. As has been previously indicated the positioning of the driver balls 22 by pilot balls 24 rather than by means of a ball cage as in the past reduces the frictional resistance which the universal joint 10 offers to rotation thereby reducing the heat generated in the operation of the universal joint of the invention and prolonging the useful life thereof. In addition during the operation of the universal joint constructed as herein disclosed the centrifugal forces developed due to the rapid rotation of both the pilot balls 24 and the driver balls 22 will be entirely cancelled within the universal joint as previously explained. This will also reduce the frictional resistance to rotation developed within the universal joint 10 during operation thereof.

For use in installations wherein axial thrust is applied to a universal joint through the shafts connected thereto or by other means applicant provides the modified universal joint 10a shown in FIGURES 5–7. The universal joint 10a is in many respects the same as the universal joint 10 illustrated in FIGURES 1–4. Elements in the universal joint 10a are therefore given reference numerals similar to those applied to the corresponding parts of the universal joint 10 which are followed by the suffix "a."

As shown best in FIGURE 5 in the modified universal joint 10a the inner surface 56a of the outer ball race is straight in cross-section between the covers 16a and 18a and clearance is provided between the axially straight inner surface 56a of the outer ball race 14a and the spherical outer surface 58a of the inner ball race 12a. This is in contrast to the arcuate cross-section of the inner surface 58 of the outer ball race 14 of the universal joint 10 which contacts the spherical outer surface of the inner ball race 12 to transfer axial thrust between the inner and outer ball races 12 and 14. No direct transfer of axial thrust between the inner and outer ball races 12a and 14a of the universal joint 10a is possible due to the modified structure of the outer ball race just described.

In the modified universal joint 10b surfaces 110 and 112 as shown in FIGURES 5 and 6 are provided on cover members 16a and 18a to slidably engage the spherical inner ball race 12a and transfer axial thrust between the covers 16a or 18a and the ball race 12a. As may be seen from inspection of the FIGURES 1 and 5 the surfaces 110 and 112 of universal joint 10a present a greater projected area over which axial forces may be resisted than the projected area of surface 56 of universal joint 10. Therefore frictional resistance to rotation, the heat generated thereby, and the tendency to bind of universal joint having axial thrust applied thereto will be less with the modified construction of FIGURES 5–7.

While a specific embodiment of the invention has been described for illustrative purposes it will be understood that other constructions incorporating the invention are possible. Applicant does not therefore wish to be limited to the structure set forth herein but wishes to include all similar constructions as fall within the scope of the appended claims.

What I claim as my invention is:

1. A ball type universal joint, comprising an inner ball race, an outer ball race operably associated with said inner ball race, driver balls positioned between said inner and outer ball races for transferring torque therebetween, and pilot balls engaging said driver balls for positioning said driver balls in the homokinetic plane during operation of said universal joint.

2. A ball type universal joint, comprising an inner ball race, first grooves spaced angularly around the radially outer surface thereof, an outer annular ball race operably associated with said inner ball race, second grooves spaced angularly around the radially inner surface thereof in mating relation with said first grooves, driver balls positioned in said mating grooves for transferring torque between said races, and pilot balls engaging said driver balls for positioning said driver balls in the homokinetic plane during operation of said universal joint.

3. A ball type universal joint, comprising an inner ball race, first driver ball grooves of arcuate cross-section spaced angularly around the radially outer surface thereof, pilot ball grooves within said first driver ball grooves, an outer annular ball race operably associated with said inner ball race, second driver ball grooves of arcuate cross-section spaced angularly around the radially inner surface thereof in mating relation with said first driver ball grooves, driver balls positioned in the mating grooves of said inner and outer ball races for transferring torque therebetween, and pilot balls positioned within said pilot ball grooves and operably associated with said driver balls to position said driver balls within said driver ball grooves in the homokinetic plane during operation of said universal joint.

4. A ball type universal joint comprising an inner ball race having an axis, first generally axial straight grooves of arcuate cross-section spaced angularly around the radially outer surface thereof, an outer annular ball race having an axis and operably associated with said inner ball race, second generally axial, straight grooves of arcuate cross-section spaced angularly around the radially inner surface thereof in mating relation with said first grooves, driver balls positioned in the mating grooves between said inner and outer ball races for transferring torque therebetween, and pilot balls operably associated with said driver balls for positioning said driver balls in the homokinetic plane during operation of said universal joint.

5. A ball type universal joint, comprising an inner ball race, first grooves of arcuate cross-section spaced angularly around the radially outer surface thereof, an outer annular ball race operably associated with said inner ball race, second grooves of arcuate cross-section spaced angularly around the radially inner surface thereof in mating relation with said first grooves, driver balls positioned in said grooves between said inner and outer ball races for transferring torque therebetween, a pair of covers secured to opposite sides of said outer ball race forming a housing for said inner ball race in conjunction with said outer ball race, and pilot balls positioned between said covers and said inner ball race and operably associated with said driver balls for positioning said driver balls during operation of said universal joint.

6. The structure as set forth in claim 5 and including an annular seal between said inner ball race and one of said covers whereby lubricant is prevented from leaking from said universal joint from between said one cover and said inner ball race.

7. A ball type universal joint, comprising an inner ball race, first grooves of arcuate cross-section spaced angularly around the radially outer surface thereof, an outer annular ball race operably associated with said inner ball race, second grooves of arcuate cross-section spaced angularly around the radially inner surface thereof in mating relation with said first grooves, driver balls positioned in said grooves between said inner and outer ball races for transferring torque therebetween, a pair of covers secured to opposite sides of said outer ball race, cam surfaces on said covers adjacent said grooves, and pilot balls positioned between said covers and said inner ball race in contact with said cam surfaces and operably associated with said driver balls for positioning said driver balls during operation of said universal joint.

8. A ball type universal joint, comprising an inner ball race, first grooves of arcuate cross-section spaced angularly around the radially outer surface thereof, an outer annular ball race concentric to and in contact with said inner ball race, second grooves of arcuate cross-section spaced angularly around the radially inner surface thereof in mating relation with said first grooves, driver balls positioned in said grooves between said inner and outer ball races for transferring torque therebetween, a pair of covers secured to opposite sides of said outer ball race, arcuate cam surfaces on said covers adjacent said grooves, and pilot balls positioned between said covers and said inner ball race in contact with said cam surfaces and operably associated with said driver balls for positioning said driver balls during operation of said universal joint.

9. A ball type universal joint comprising an inner ball race, first driver ball grooves of arcuate cross-section spaced angularly around the radially outer surface thereof, pilot ball grooves within said first driver ball grooves, an outer annular ball race concentric to and in contact with said inner ball race, second driver ball grooves of arcuate cross-section spaced angularly around the radially inner surface thereof in mating relation with said first driver ball grooves, driver balls positioned in said driver ball grooves between said inner and outer ball races for transferring torque therebetween, a pair of covers secured to opposite sides of said outer ball race, cam surfaces on said covers adjacent said pilot ball grooves, and pilot balls positioned in said pilot ball grooves in contact with said cam surfaces and operably associated with said driver balls for positioning said driver balls during operation of said universal joint.

10. A ball type universal joint, comprising an inner ball race, an annular outer ball race concentric with and in contact with the radially outer surface of said inner ball race, a pair of covers, one of which is annular, secured to said outer ball race on opposite surfaces thereof to form a housing around said inner ball race, a shaft extending through said annular cover and secured to said inner ball race for rotation therewith, a second shaft secured to the exterior of the other of said covers for rotation therewith and extending generally oppositely from said first shaft with respect to said ball races, driver balls positioned between said inner and outer ball race for transferring torque therebetween, and pilot balls acting between said covers, said inner ball race and said driver balls to position said driver balls during operation of said universal joint.

11. The structure as set forth in claim 10 and including an annular seal between said inner ball race and said annular cover operable to prevent lubricant from leaking from said universal joint from between said annular cover and said inner ball race.

12. The structure as set forth in claim 10 including an annular groove in said annular cover, an annular groove in said inner ball race at the end thereof adjacent said annular cover, an annular flexible seal extending between said annular cover and said inner ball race, opposite edges of said annular seal being inserted within a different one of said grooves, and a pair of sleeves extending around said opposite edges of said seal to clamp said opposite edges within said grooves to prevent leaking of lubricant from said universal joint from between said annular cover and said inner ball race.

13. The structure as set forth in claim 12 wherein said inner ball race is annular and including a plug having a small orifice in the center thereof positioned over the end of the inner ball race remote from said seal to substantially close the opening through the inner ball race to prevent loss of lubricant through said opening.

14. A ball type universal joint, comprising an inner ball race, first grooves of arcuate cross-section spaced angularly around the radially outer surface thereof, an annular outer ball race concentric with and in contact with the radially outer surface of said inner ball race, second grooves of arcuate cross-section spaced angularly around the radially inner surface thereof in mating relation with said first grooves, a pair of covers, one of which is annular, secured to said outer ball race on opposite surfaces thereof to form a housing around said inner ball race, a shaft extending through said annular cover and secured to said inner ball race for rotation therewith, a second shaft secured to the exterior of the other of said covers for rotation therewith and extending generally oppositely from said first shaft with respect to said ball races, driver balls positioned in said grooves and between said inner and outer ball race for transferring torque therebetween, and pilot balls acting between said covers, said inner ball race and said driver balls to position said driver balls during operation of said universal joint.

15. A ball type universal joint, comprising an inner ball race, first driver ball grooves of arcuate cross-section spaced angularly around the radially outer surface thereof, pilot ball grooves within said first driver ball grooves, an annular outer ball race concentric with and in contact with the radially outer surface of said inner ball race, second grooves of arcuate cross-section spaced angularly around the radially inner surface thereof in mating relation with said first grooves, a pair of covers, one of which is annular, secured to said outer ball race on opposite surfaces thereof to form a housing around said inner ball race, arcuate cam surfaces on said covers adjacent said grooves, a shaft extending through said annular cover and secured to said inner ball race for rotation therewith, a second shaft secured to the exterior of the other of said covers for rotation therewith and extending generally oppositely from said first shaft with respect to said ball races, driver balls positioned in said driver ball grooves between said inner and outer ball race for transferring torque therebetween, and pilot balls positioned in said pilot ball grooves, in contact with said arcuate cam surfaces and said driver balls to position said driver balls during operation of said universal joint.

16. A universal joint comprising an inner race member having first generally axial grooves spaced angularly around the radially outer surface thereof, an outer race member operably associated with said inner race member and having second generally axial grooves spaced angularly around its inner surface in mating relation with said first grooves, driver balls in said mating grooves for transferring torque between said members, and pilot balls between said members and engaging axially opposite sides of said driver balls for positioning said driver balls in the homokinetic plane during operation of the universal joint.

17. The universal joint defined in claim 16 wherein pilot ball grooves are formed in the said first grooves of said inner race and said pilot balls are received in said pilot ball grooves.

18. The universal joint defined in claim 16 in which said pilot balls are engaged by surfaces of said inner and outer race members which are contoured to guide the movements of said pilot balls.

19. The universal joint defined in claim 16 in which said grooves are straight.

20. A universal joint, comprising an inner ball race, an outer ball race operably associated with said inner ball race, driver balls positioned between said inner and outer ball races for transferring torque therebetween, and separate pilot means for each driver ball engaging opposite sides thereof to position the same in the homokinetic plane during operation of said universal joint, said pilot means for each driver ball being separate from and movable independently of the pilot means for the other driver balls.

21. The universal joint defined in claim 20, in which each said separate pilot means comprises pilot elements on axially opposite sides of the associated driver ball in contact therewith.

22. A universal joint comprising an inner race member having first grooves spaced angularly around the radially outer surface thereof, an outer race member operably associated with said inner race member and having second grooves spaced angularly around its inner surface in mating relation with said first grooves, driver balls in said mating grooves for transferring torque between said members, and pilot balls between said members and engaging said driver balls for positioning said driver balls in the homokinetic plane during operation of the universal joint.

23. A universal joint comprising an inner race member having first generally axial grooves spaced angularly around the radially outer surface thereof, an outer race member operably associated with said inner race member and having second generally axial grooves spaced angularly around its radially inner surface in mating relation with said first grooves, driver balls in said mating grooves for transferring torque between said members, and separate pilot means for each driver ball, each pilot means being located between said members and engaging axially opposite sides of the associated driver ball for positioning the same in the homokinetic plane during operation of the universal joint, said pilot means for each driver ball being separate from and movable independently of the pilot means for the other driver balls.

24. The universal joint defined in claim 23 in which said grooves are straight.

25. The universal joint defined in claim 23 in which said pilot means are engaged by surfaces of said inner and outer race members which are contoured to guide the movements of said pilot means.

26. A universal joint, comprising an inner ball race, an outer ball race operably associated with said inner ball race, driver balls positioned between said inner and outer ball races for transferring torque therebetween, and separate pilot means for each driver ball, each pilot means engaging the associated driver ball to position the same in the homokinetic plane during operation of the joint, said pilot means for each driver ball being separate from and movable independently of the pilot means for the other driver balls.

27. A universal joint, comprising an inner annular race member, an outer annular race member operably associated with said inner race member, means positioned between said inner and outer race members for transferring torque therebetween, said outer race member having a wall closing one end thereof, said wall extending across the corresponding end of said inner race member, a plug having a small orifice in the center thereof secured to said corresponding end of the annular inner race member to substantially close the opening through the inner race member, and a flexible seal between said inner and outer race members at the opposite ends thereof, said wall of said outer race member, said plug end and said seal serving to prevent the escape of lubricant from said joint.

28. A universal joint comprising an inner ball race, an outer annular ball race operably associated with said inner ball race, driver balls positioned between said inner and outer races for transferring torque therebetween, a pair of covers secured to opposite ends of said outer ball race and cooperable with said outer ball race to form a housing for said inner ball race, and separate pilot means for each driver ball, each pilot means engaging the associated driver ball to position the same in the homokinetic plane during operation of the universal joint, said pilot means being guided by surfaces of said covers and the pilot means for each driver ball being separate from and movable independently of the pilot means for the other driver balls.

29. The universal joint defined in claim 28 wherein said inner race has a spherical outer surface, and said outer race has a spherical inner surface engaging the spherical surface of said inner race for the transfer of axial thrust.

30. The universal joint defined in claim 28 wherein said inner race has a spherical outer surface, and said covers have spherical surfaces engaging the spherical surface of said inner race for the transfer of axial thrust.

31. A universal joint, comprising an inner race member, an outer race member within and operably associated with said inner race member, means positioned between said inner and outer race members for transferring torque therebetween, said outer race member having an axial extension at one end, said inner race member having an axial extension at the end thereof corresponding to the said one end of said outer race member, the extension of said outer race member having an external annular surface and axially outwardly thereof an external annular groove, the extension of said inner race member having an internal annular surface and axially outwardly thereof an internal annular groove, an annular flexible seal between said inner and outer race members to prevent leakage of lubricant from the universal joint while permitting unrestricted universal movement of said race members, marginal annular beads on said seal respectively received in said grooves, an annular sleeve encircling said extension of said outer race member in concentric relation therewith and in surface-to-surface engagement with the external annular surface thereof, and an annular sleeve within said extension of said inner race member in concentric relation therewith and in surface-to-surface engagement with the internal annular surface thereof, said annular sleeves extending axially outwardly from the annular surfaces of said extensions engaged thereby in concentric overlying relation to said grooves and engaging said beads to retain said beads in said grooves.

32. A universal joint, comprising an inner race member, an outer race member within and operably associated with said inner race member, means positioned between said inner and outer race members for transferring torque therebetween, said outer race member having an axial extension at one end, said inner race member having an axial extension at the end thereof corresponding to the said one end of said outer race member, the extension of said outer race member having an external annular groove, the extension of said inner race member having an internal annular groove, an annular flexible seal between said inner and outer race members to prevent leakage of lubricant from the universal joint while permitting unrestricted universal movement of said race members, marginal annular portions of said seal respectively received in said grooves, an annular ring encircling said extension of said outer race member in concentric relation therewith, and an annular ring within said extension of said inner race member in concentric relation therewith, said annular rings being disposed in overlying relation to the grooves of the associated extensions and engaging the marginal seal portions to retain them in said grooves.

References Cited in the file of this patent

UNITED STATES PATENTS

| | | |
|---|---|---|
| 1,376,437 | Hood | May 3, 1921 |
| 1,947,046 | Hoffman | Feb. 13, 1934 |
| 1,980,846 | Bradley | Nov. 13, 1934 |
| 1,985,278 | Bradley | Dec. 25, 1934 |
| 2,150,942 | Rzeppa | Mar. 21, 1939 |
| 2,150,952 | Ward | Mar. 21, 1939 |
| 2,235,002 | Anderson | Mar. 18, 1941 |
| 2,323,569 | Rzeppa | July 6, 1943 |
| 2,510,362 | Anderson | June 6, 1950 |
| 2,514,227 | Dodge | July 4, 1950 |
| 2,579,356 | Anderson | Dec. 18, 1951 |
| 2,615,317 | Rzeppa | Oct. 28, 1952 |
| 2,908,151 | Wahlmark | Oct. 13, 1959 |